March 7, 1944.　　　　A. ANHEUSER　　　　2,343,271
METHOD AND APPARATUS FOR CUTTING FILES
Filed Sept. 4, 1942　　　5 Sheets-Sheet 1
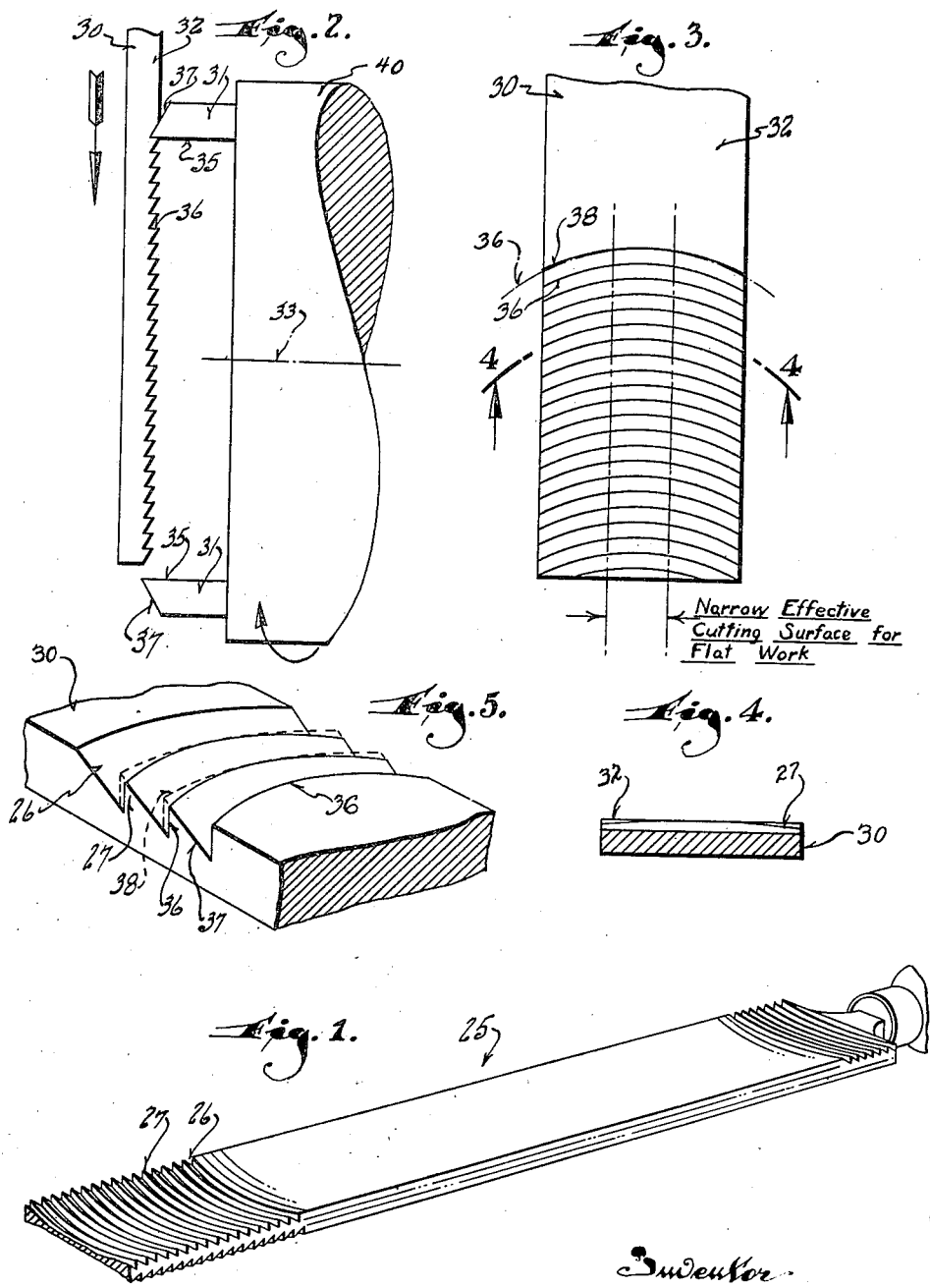
Inventor
Alfred Anheuser

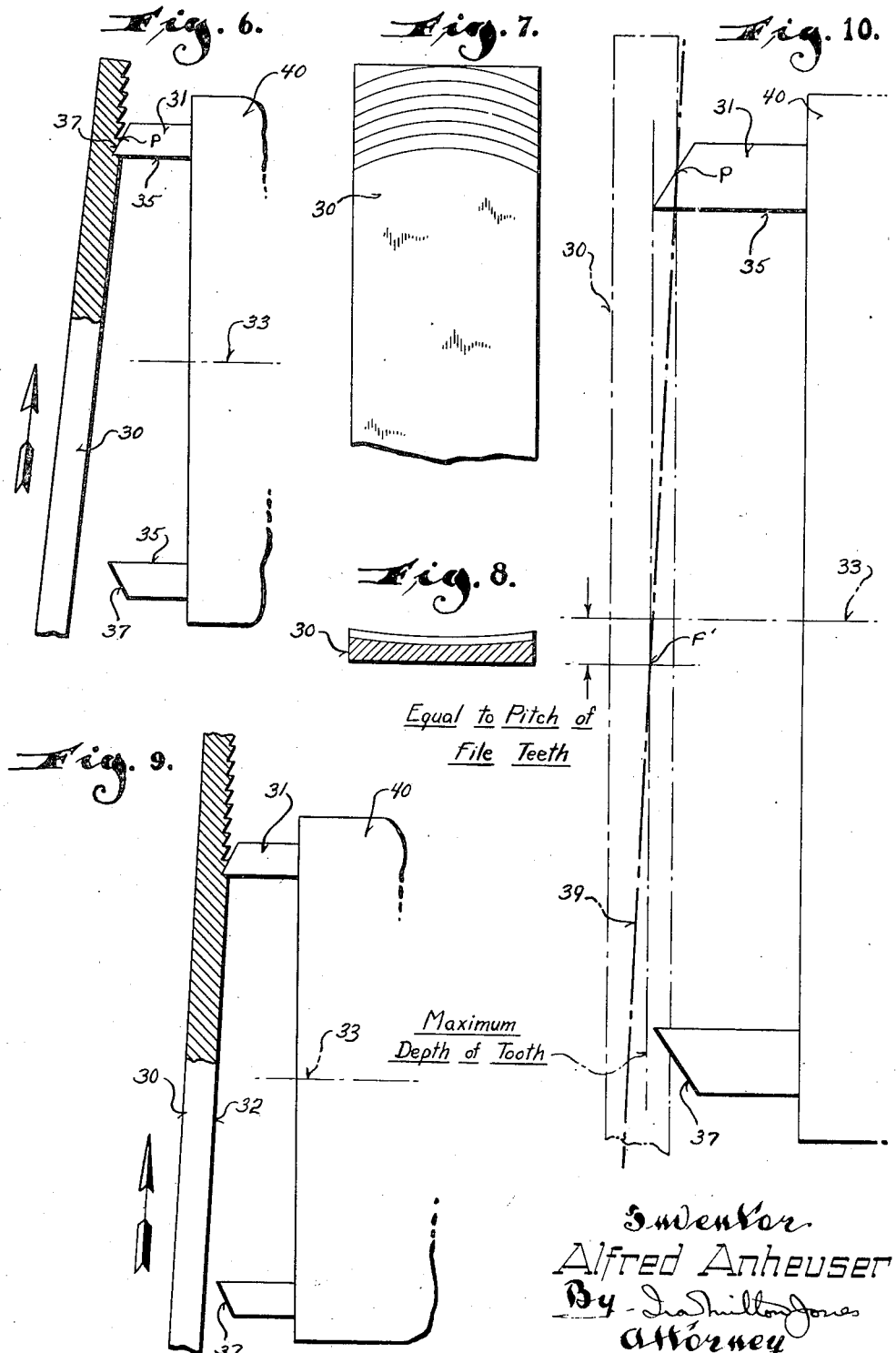

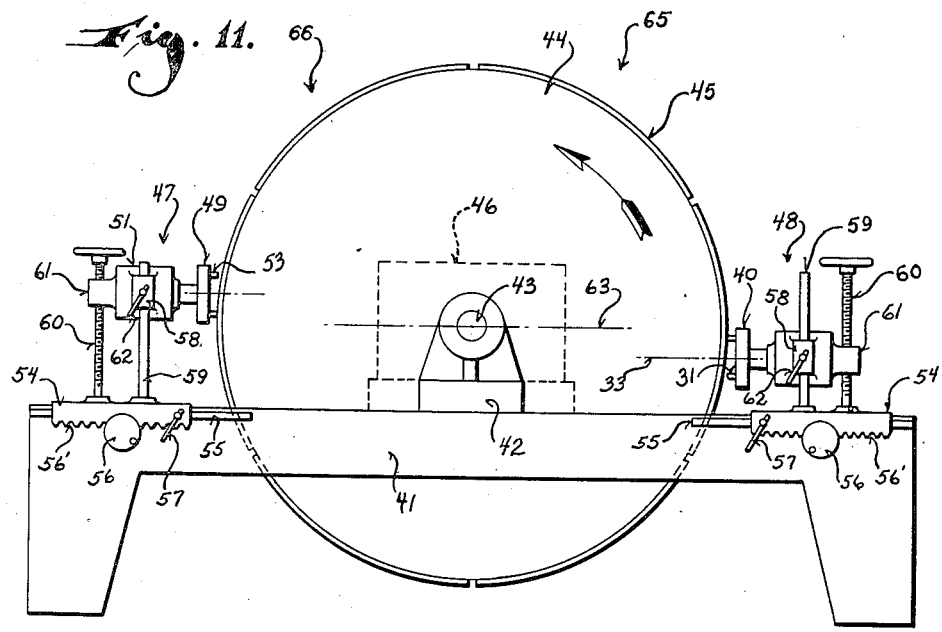
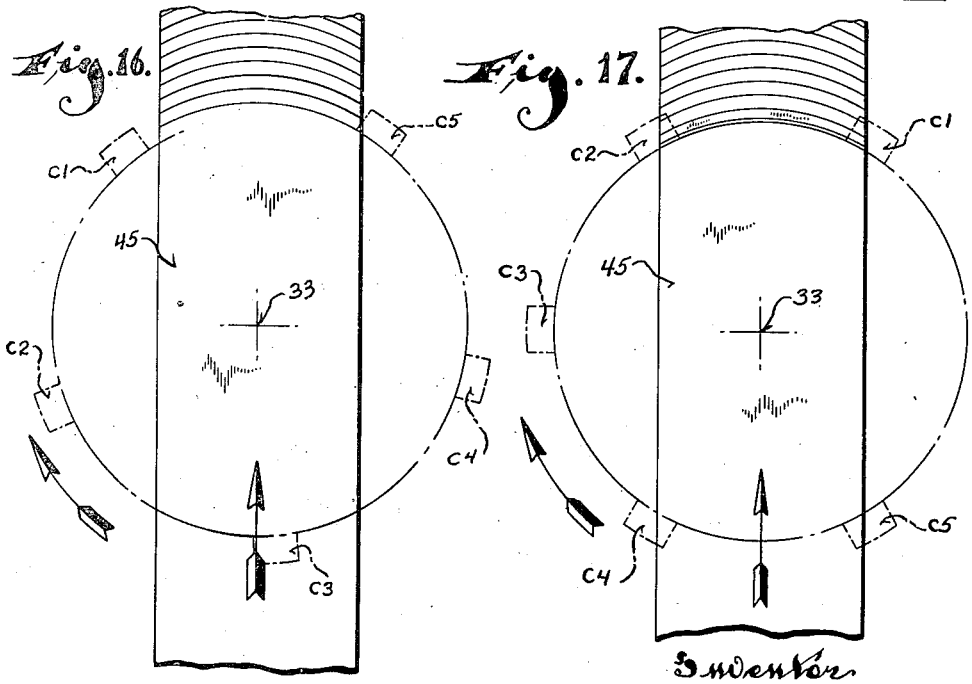

March 7, 1944. A. ANHEUSER 2,343,271
METHOD AND APPARATUS FOR CUTTING FILES
Filed Sept. 4, 1942 5 Sheets-Sheet 4
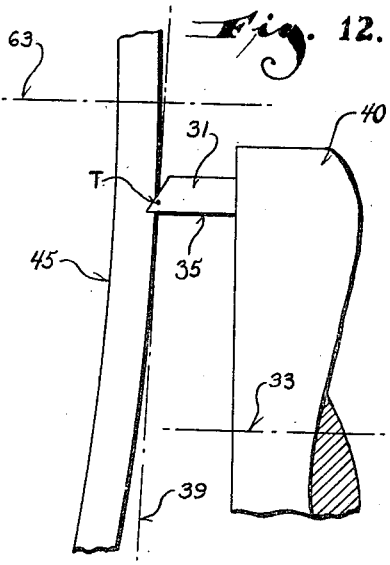
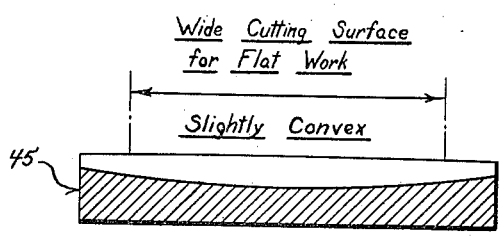
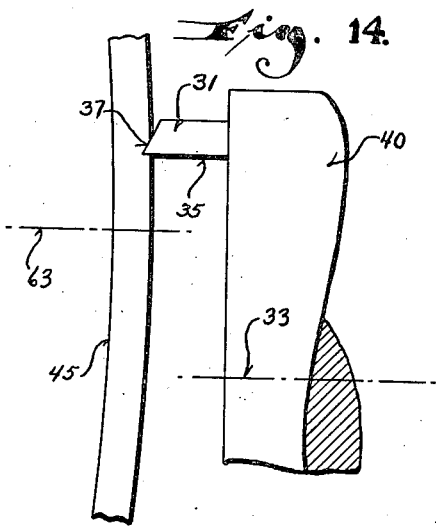
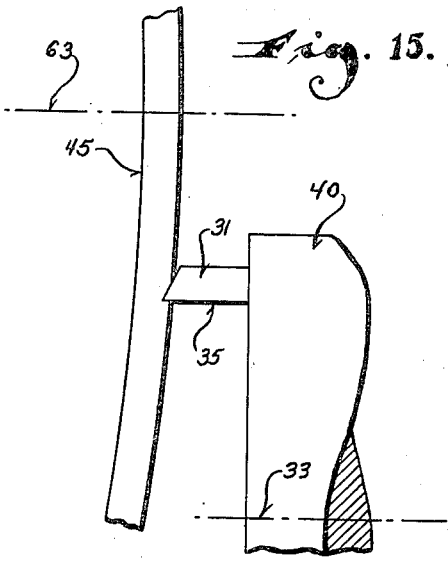
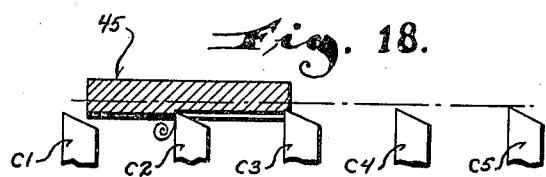
Inventor
Alfred Anheuser Fig. 19. Area of Blank Swept by Surfacers and Rough Cutters Inventor
Alfred Anheuser
By
Attorney Patented Mar. 7, 1944

2,343,271

UNITED STATES PATENT OFFICE 2,343,271

METHOD AND APPARATUS FOR CUTTING FILES

Alfred Anheuser, West Allis, Wis., assignor to Ernest A. Anheuser, Milwaukee, Wis.

Application September 4, 1942, Serial No. 457,376

22 Claims. (Cl. 76—12)

This invention relates to files and refers more particularly to a method of and apparatus for making milled files.

The method of this invention contemplates milling arcuate teeth on file stock to form an abrading tool of the type now particularly adapted for use in the aircraft and automotive industries.

Perhaps the most widely used method for milling files of this type consists in subjecting file blanks to the cutting action of cutters arranged in a circle on a suitable rotatable tool holder. In this method, it is necessary to arrange either the file blanks or the tool holder for the cutters so that milling takes place at only one portion of the circular path in which the cutters travel, while the remaining portion of their path is spaced away from the surface of the blank to be milled to provide clearance for the cutters during their travel to and from cutting engagement with the blanks.

Clearance is generally provided by having the file blanks tilted longitudinally slightly out of a plane normal to the axis about which the cutters are rotated during the milling operation. This method of obtaining clearance for the cutters is disclosed in the patent to E. A. Anheuser, No. 1,829,385, issued October 27, 1931.

Most files cut in this manner, however, have a transversely concave cutting surface wherein the ends of the teeth near the edges of the file are higher than their medial portions. Certain types of work require a file the teeth of which are transversely concave, but it will be apparent that it is impossible to produce a smooth flat filed surface with such a file for the high ends of the teeth objectionably score the work and tend to give the same a convex surface.

Sandblasting of the high ends of the file teeth cut in this manner has generally been resorted to in an attempt to provide a uniform flat cutting surface on the file.

While it is possible to materially improve the file by sandblasting, it will be readily apparent that sandblasting does not constitute a positive method capable of accurate control. In any event, sandblasting concave file surfaces is incapable of providing a uniform substantially flat cutting surface of the type suitable for most filing operations.

Although files are capable of being cut in the aforesaid manner to have a transversely flat filing surface, the hardening process which follows the cutting operation invariably distorts the cut files out of their flat condition. In the case of a file milled to have opposite transversely flat cutting surfaces, the hardening process usually renders one face of the file transversely concave and the opposite face of the file transversely convex as a result of warping. The concave face of the file, as stated, however, is useless whenever it is desired to obtain a smooth flat surface on a piece of work by filing, and the file has but one effective filing face although cut to have two.

It is apparent, therefore, that due to warping, it is impossible to obtain a transversely flat, uniform cutting surface on milled files.

The method of the aforementioned Anheuser patent seeks to overcome this objection by milling the teeth of the files to a transversely convex curvature. This method thereby precludes the possibility of obtaining concave teeth and also obviates the necessity for correcting concave files by sandblasting.

In the method of this patent, the file teeth are milled while the file blank is tilted slightly out of a plane normal to the axis of rotation of the tool carrier by cutters arranged in two concentric rows on the carrier.

The cutting tools on the larger radius of rotation are first engaged with the file stock and the second row of cutting tools on the smaller radius of rotation subsequently trim down the high ends of the transversely concave teeth formed by the first row of cutters. This method thus produces files without the objectionable concave cutting face but the decidedly convex cutting face resulting on the files made by this method cannot be expected to produce a substantially flat surface where such a surface is to be obtained by filing.

It will be appreciated that only a narrow central portion of the filing surface of a file having convex teeth may act upon flat work surfaces, the active cutting edge of the teeth of course being determined by the degree of transverse convexity of the teeth.

The method of the aforementioned Anheuser patent has also been found objectionable due to the extreme difficulty of maintaining the cutters in proper cutting relationship and condition. This results from the fact that a very exact relationship is necessary between the two concentric rows of cutters and because of the difficulty and expense of sharpening the cutters.

The present invention seeks to overcome the objections to milled files hereinabove pointed out by providing a method and an apparatus for milling files whereby the transverse shape of the cutting edges of the file teeth may be accurately determined and controlled at will; and whereby the effective width of the cutting faces of the files may be increased to comprise the major width of the files without any danger of the ends of the teeth scoring the work so as to broaden the field of use of such files and render the same desirable in practically all metal working industries and especially useful for lathe work.

The present invention, therefore, has as its main object to provide a method and apparatus which facilitates and simplifies the milling of files and whereby any desired shape of cutting surface may be obtained.

With the above and other objects in view, which will appear as the description proceeds, this invention resides in the novel method and in the novel combination and arrangement of mechanical expedients for carrying the same into effect, substantially as hereinafter described, and more particularly defined by the appended claims, it being understood that such changes in the precise embodiment of the herein-disclosed invention may be made as come within the scope of the claims.

The accompanying drawings illustrate several complete examples of the physical embodiments of the invention constructed according to the best modes so far devised for the practical application of the principles thereof, and in which:

Figure 1 is a perspective view of a milled file of the type which this invention concerns showing the desirable substantially flat filing surfaces on opposite sides of the file;

Figures 2 to 8, inclusive, diagrammatically illustrate different methods of presenting flat file stock to the revolving cutters and the resulting transverse shape of the file teeth at their cutting edges;

Figure 9 diagrammatically illustrates the presentation of flat file stock to the revolving cutters for the milling of transversely flat file teeth in the stock;

Figure 10 is a diagrammatic view showing the manner of determining the angle of the flat file stock necessary to enable the milling of transversely flat file teeth;

Figure 11 is a diagrammatic side elevational view of one form of apparatus for carrying out the method of this invention, and wherein the file stock is acted upon by the revolving cutters while in a longitudinally curved condition;

Figure 12 is a diagrammatic view illustrating the relationship between the curved stock and the cutter necessary to produce file teeth having cutting edges as close to being transversely flat as possible while still retaining a degree of convexity.

Figure 13 is an enlarged cross sectional view of a file milled in the Figure 12 position of the cutting head;

Figure 14 is a view similar to Figure 12 illustrating the adjustment of the cutting head necessary to produce file teeth having more convex cutting edges;

Figure 15 is a view similar to Figure 12 illustrating the adjustment of the cutting head necessary to produce file teeth having a concave cutting edge;

Figure 16 is a view of a portion of a partly cut file blank diagrammatically illustrating the action of spirally arranged cutters thereon;

Figure 17 is a view similar to Figure 16 showing a circular arrangement of cutters;

Figure 18 is a diagrammatic view illustrating the progressive method employed in the milling of the file teeth;

Figure 19 is a diagrammatic view illustrating the manner in which file stock is surfaced and rough cut preliminary to the final tooth cutting operation.

Figure 20:
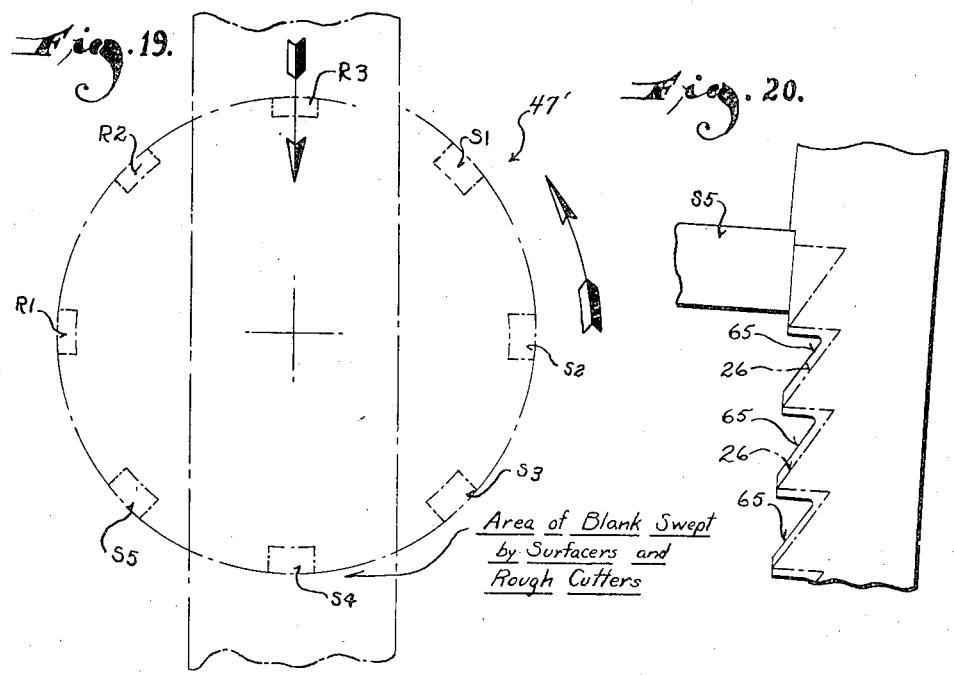
Figures 20, 21, and 22 illustrate different stages in the surfacing and rough cutting operation.
Figure 21:
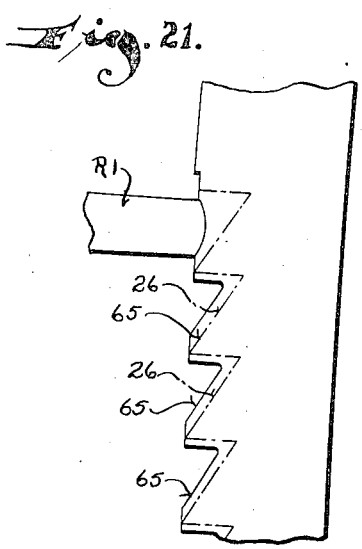
Figure 22:
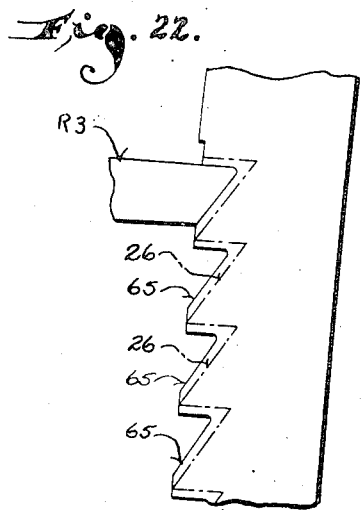

The method of this invention contemplates milling arcuate teeth on file stock or blanks by presentation of the blanks to a cutter revolving about a fixed axis and having its point travelling in a fixed plane normal to the cutter axis.

Figure 1 of the drawings illustrates the type of file which this invention concerns. The file, designated generally by the numeral 25, is a flat, two-faced file having equispaced arcuate grooves 26 defining equispaced substantially transversely flat cutting teeth 27.

It might be supposed that the simplest method of milling flat file teeth by means of a revolving cutter would be one such as illustrated in Figure 2. The file stock 30 in this instance is fed past the revolving cutters 31 with the face 32 of the stock in which teeth are to be milled perpendicular to the axis 33 about which the cutter revolves.

The length of the milled surface, however, is limited to a dimension less than the diameter of the circular path in which the cutters revolve, and inasmuch as it is preferable to keep the cutting circle not more than three to three and one half inches in diameter, it will be seen that this method cannot produce milled files of proper lengths. The ordinary milled file usually has a length of from eight to eighteen inches.

Aside from this objection, this manner of presenting the file stock to the revolving cutters is utterly incapable of producing arcuate, transversely flat milled teeth on the file.

This results from the fact that the face 35 of the cutter 31 which forms the front of the file teeth defines one arcuate edge 36 of the groove 26 cut in the blank as the cutters sweep transversely thereacross, while the slanting heel 37 of the cutters which form the backs of the file teeth define the opposite arcuate edge 38 of the groove. As will be apparent from Figures 3 and 5, these arcuate edges of the groove are concentric to each other with the edge 36 on a smaller radius than the other edge 38.

Consequently, upon indexing of the file blank in the direction of the arrow a distance equal to the radial distance between the arcuate edges of the groove, the face 35 of the cutter is brought substantially in line with the edge 38 of the groove at the center of the blank; but inasmuch as the face 35 travels in a circular path of shorter radius than the arcuate edge 38 of the groove, the sides of the file blank will be trimmed down as indicated. Such trimming down of the sides of the stock results in the milling of transversely convex teeth as shown in Figure 4.

At present, the method illustrated in Figures 6 to 8, inclusive, is most commonly employed in milling files. In this method, the file stock or blanks 30 are presented to the revolving cutters 31 while held in a flat position tilted slightly out of a plane normal to the cutter axis to provide the necessary clearance for the cutters during their travel to and from cutting engagement with the stock.

However, as is clearly illustrated in Figures 6 and 7, the substantially arcuate edge 38 of the groove milled into the stock and defined by the slanting heel 37 of the cutter is now caused to be of less radius at the face of the stock than the arcuate groove 36 defined by the face 35 of the cutter. This results from the fact that the slanting heel of the cutter digs deeper into the stock as the cutter approaches the center of the stock. Consequently, upon indexing of the blank a distance to effect formation of a tooth having a cutting edge extending continuously transversely across the face of the blank, it is necessary to cut away part of the center of the face of the blank during the formation of the tooth. This results in the formation of teeth having transversely concave cutting edges as shown in Figure 8.

While files having transversely concave cutting surfaces have a definite use, it is only by sandblasting the sides of the cutting surface that anything approaching a flat cutting surface can be formed on milled files.

Because sandblasting is not a positive operation capable of accurate control, it will be apparent that hitherto it was extremely difficult if not impossible to obtain a uniform flat filing surface on milled files. Sandblasting the high portions of milled teeth is also objectionable in that it impairs the life of the file through removal of a considerable portion of the teeth at their cutting edges.

From the description thus far, it will be seen that the angle at which flat file stock is presented to the revolving cutters determines whether the cutting edges of the file teeth will be transversely convex or concave. By careful adjustment of this angle of presentation or in other words the degree of tilt of the file stock out of perpendicular with respect to the cutter axis, it is also possible to mill files with teeth having perfectly flat cutting edges. This angular position of the flat file stock with relation to the cutter axis is shown diagrammatically in Figure 9, and the manner of determining this position of the stock is illustrated in Figure 10.

Referring to Figure 10, it is seen that the line 39 defines an angle to the axis of cutter rotation which corresponds to the angle at which the face of the stock must be arranged with respect to the cutter axis so as to enable the milling of file teeth having flat cutting edges.

In the following rule which may be used to determine the angularity of the line 39 with relation to the cutter axis, it is to be assumed that the cutting head 40 carries a multiplicity of cutters 31 arranged in a single row and adjusted to make a progressive cut in the stock as shown in Figure 18, and that the cutting bit 31 illustrated represents the final cutting bit which completes the groove and consequently determines the maximum depth of the grooves to be cut for a predetermined size of file teeth:

If flat bar stock 30 is presented to a revolving cutter of the type described, longitudinally inclined so that its face presented to the tool coincides with a line drawn from a point P on the cone traced by the heel of the final cutter tooth and lying at the intersection of the cone by a plane normal to the cutter axis and representing the maximum depth of the cut, through the cutter axis and to a point P' at the opposite side of the cutter axis and representing the bottom of the cut made by the final cutter tooth, with the point P' spaced radially from the cutter axis the pitch distance of the file teeth, the crests of the teeth cut will all lie in a flat plane but the roots of the teeth will have a slight transverse concavity.

Obviously, for the teeth to be of uniform depth across the width of the stock, the flat face of the stock, besides coinciding with the line 39, must lie in a plane passing through the line 39 and normal to the plane defined by the cutter axis and the line 39, hereinafter referred to as the cutter axis plane.

The reason that this disposition of the flat stock produces file teeth having transversely flat cutting edges results from the fact that at this particular angle of tilt, the edges 36 and 38 of the grooves cut in the blank are of equal curvature, that is, these edges are congruent, so that upon indexing of the blank, the cutting edges of the teeth are formed completely across the width of the blank without the necessity of trimming down the edges or centers of the teeth as in the case with the disposition of the blank in Figures 2 and 6 respectively.

Previously it has been considered impractical, however, to mill files with opposite transversely flat cutting faces, since in the hardening process which follows milling, the files warped and one cutting face of the file invariably became transversely concave, while the opposite cutting face of the file became transversely convex. For filing flat work, therefore, at least one cutting face of the file was useless, and the degree of transverse convexity of the other face thereof often rendered the major portion of the cutting face ineffective. Needless to say, the degree of convexity resulting from warping could not be controlled or minimized, and the final transverse shape of the cutting face of the file was unpredictable.

This indicates the desirability of milling file teeth with substantially flat cutting edges but in such a manner as to preclude one cutting face of the file becoming transversely concave as the result of warping in the hardening process.

To insure against obtaining a transversely concave final cutting face at either side of the milled files the method of this invention proposes to so mill the files that the cutting edges of their teeth have a slight degree of transverse convexity which will be sufficient even though the file may warp through hardening to preclude either cutting face thereof assuming a transversely concave shape.

It is to be understood that the degree of transverse convexity with which the cutting edges of the teeth are formed is very slight with the curvature only great enough so that in the event of warping, the face of the file which hitherto became concave may become very nearly transversely flat while still retaining a degree of transverse convexity. This assures maximum efficiency for the filing of flat work.

Using flat file stock or blanks, it is possibe to obtain the slight degree of transverse convexity at the cutting edges of the file teeth necessary to preclude the formation of transversely concave cutting faces on the finished files. This may be accomplished by very slightly tilting the flat file stock out of its angular position shown in Figure 9 where flat cutting edges on the milled teeth are produced toward the position of the stock illustrated in Figure 2, wherein the disposition of the stock is such as to produce file teeth having transversely convex cutting edges. It is to be understood, however, that the perpendicular relationship between the face of the flat stock and the cutter axis plane is maintained. While this manner of obtaining the desired slightly convex cutting edges on the file teeth is entirely practical, it has been found preferable to employ the apparatus shown in Figure 11 for this purpose.

As will now appear, the use of the apparatus of this invention entails the practice of an entirely new method of presenting the file blanks to the revolving cutters, and which enables files to be milled with any desired shape of filing surface.

In its broadest aspects, the method of this invention consists in longitudinally flatwise curving or bending the file blanks to a predetermined arc, and advancing the blanks endwise in the arc of their curvature past the more or less conventional cutting head arrangement hereinbefore described with the center about which the blanks revolve so related to the axis of the cutting head that milling takes place at only one area of the stock while clearance is provided for the cutters during their travel to and from engagement with the stock.

Generally, the area at which cutting should be effected in order to produce a substantially flat cutting surface on the blanks is determined by disposing the cutting head so that cutting takes place close to a radial plane of the blank being milled and which plane is parallel to the axis about which the cutter head rotates.

As shown in Figure 11, one form of apparatus suitable for carrying out the method of this invention comprises a supporting bed 41 having spaced aligned bearing brackets 42 (only one of which is shown) mounted on its top surface. The shaft 43 of a carrier wheel 44 is journalled in the bearing brackets to mount the wheel for rotation on a fixed horizontal axis.

The file stock may be in the form of blanks 45 bent longitudinally flatwise to correspond to the arcuate shape of the periphery of the carrier wheel. These blanks are secured directly to the periphery of the wheel by suitable clamps (not shown) or any other means which does not interfere with the milling of the blanks.

As will hereinafter more fully appear, rotation is transmitted to the carrier wheel by any suitable drive transmission indicated at 46 operatively connected with the shaft 43 to move the blanks endwise in the arc of their curvature. For purposes of illustration, it may be assumed that the carrier wheel and the blanks thereon are driven in a counterclockwise direction as viewed in Figure 11.

Also mounted on the bed 41 are a pair of cutting head assemblies 47 and 48. These cutting head assemblies are located adjacent to the periphery of the carrier wheel preferably at diametrically opposite points thereof. The cutting head assemblies 47 and 48 carry tool holders or cutting heads 49 and 40, respectively, rotatable on axes normal to the axis of rotation of the carrier wheel 44, so that the hereinbefore mentioned cutter axis plane is always perpendicular to the axis of rotation of the wheel and the blanks thereon. Any suitable drive means, such as motors 51 and 52 may be employed for rotating the tool holders of the respective cutting heads.

The tool holder 49 of the cutting head assembly 47 is provided with one or more surfacing tools 53 of a conventional type, while the tool holder 40 of the cutting head assembly 48 carries a plurality of cutting tools 31 such as diagrammatically illustrated in Figures 16 and 17 and designated by the reference characters C1, C2, C3, C4 and C5.

Preferably, these cutting tools are arranged spirally with relation to the cutter axis 33 as shown in Figure 16. When spirally arranged cutters are used, the leading cutting bit C1 is closest to the cutter axis 33, and the following tools C2, C3, C4 and C5 are spaced progressively farther from the cutter axis with the bit C5 spaced from the bit C1 a radial distance equal to the pitch of the teeth to be milled.

When this type of cutter is employed, the carrier wheel is of course rotated at a uniform rate of speed which rate is synchronized with the rate at which the tool holder 40 is rotated. Obviously, the course of the spiral defined by the cutters during rotation of the tool holder is a factor in determining the rate at which both the cutters and blanks are to be revolved.

If desired, however, the cutters may be arranged concentric to the cutter axis 33 as shown in Figure 17. With this form of tool holder, the carrier wheel is, of course, driven with an intermittent motion to present the blanks to the cutters in a step-by-step advance, with indexing motion imparted to the blanks just prior to the establishment of cutting engagement of the cutter C1 therewith.

The cutting tools of both holders 40 and 49 are preferably mounted so that they project different distances from the face of the holder, as diagrammatically illustrated in Figure 18, to progressively engage the stock and make a complete arcuate cut therein during one revolution of the tool holder.

Each of the cutting head assemblies 47 and 48 is horizontally and vertically adjustable with respect to the axis of rotation of the carrier wheel 44. To this end each of the cutting head assemblies is carried by a sliding bracket 54 constructed to be horizontally reciprocable on rails 55 projecting from opposite sides of the supporting bed.

The bracket may be moved horizontally toward or from the carrier wheel 44 by rotating a hand wheel 56. This hand wheel drives a pinion (not shown) which meshes with a rack 56' formed on a portion of the bracket. A lock 57 provides for securing the bracket in any desired position of adjustment.

As stated, each of the cutting head assemblies is carried by the brackets for vertical adjustment. To this end, each cutting head assembly is provided with bosses 58 at opposite sides thereof bored to slidably receive vertical rods 59 having their lower ends anchored in the bases of their brackets 54. A vertical screw shaft 60 carried by each bracket 54 has threaded engagement with a hub 61 on the cutting head assemblies and provides for adjusting the vertical position of the assemblies on their rods 59. Locks 62 secure the cutting head assemblies in any desired position of vertical adjustment.

Although the cutting head assemblies are vertically and horizontally adjustable, it will be seen that the mounting bracket 54 for the tooth forming cutter head assembly 48 at all times holds the same with its axis of rotation parallel to a radial plane 63 of the blank in position to be milled and which plane extends horizontally through the axis of the wheel 44, and with the cutter axis plane perpendicular to the axis of the wheel 44 and the blanks carried thereby.

For the milling of file teeth having substantially transversely flat cutting edges, it is necessary to first determine the angle which the line 39 of Figure 10 defines with relation to the cutter axis. The same rule for the determination of this angle applies for the milling of the longitudinally curved stock 45 as in the previous instance.

Thus if the cutter 40 is so adjusted with relation to the carrier wheel axis (the center of curvature of the stock) that milling takes place at an area of the stock at which a plane normal to the cutter axis plane and parallel with the line 39 is tangent to the curved face of the stock, file teeth with substantially flat topped cutting edges will result; for at this area the position of the stock substantially duplicates the angular relationship between the flat bar stock and the cutters of the Figure 9 illustration.

This follows from the fact that when the stock is presented to the tool holder 40 at this angle, the edge 38 of the groove cut by the heel 37 of the final cutting bit C5 has the same curvature as the edge 36 of the groove cut by the face 35 of the bits, so that upon indexing the stock to make the next cut and to complete one file tooth, the edge of the second groove defined by the heel of the bit C5 is congruent with the edge of the first cut made by the face 35 of the cutting bits.

Figure 12 diagrammatically illustrates the manner in which the plane parallel to the line 39 defines the area of the arcuate blanks at which milling should be effected in order to produce file teeth having substantially transversely flat cutting edges. If milling was to be effected with the cutting head 40 arranged to mill a groove in the stock the edge 38 of which medially of the face of the blank passed through the point T at which the line or plane 39 is tangent to the face of the stock, the cutting edges of the teeth milled would be substantially transversely flat. It is preferable, however, to raise the tooth forming cutting head assembly a trifle toward the radial plane 63 of the blank to be cut so that the edges 36 and 38 of the groove medially of the face of the blank lie substantially equal distances to each side of the point T. Such disposition of the cutting head 40 assures the milling of almost flat file teeth having a slight degree of convexity at their cutting edges as shown in Figure 13, and precludes the formation of transversely concave cutting faces on the finished straightened files.

As will be apparent, since the angularity of the line 39 and the plane parallel thereto changes but slightly for the milling of files with different tooth sizes and pitches, milling will always take place close to the radial plane 63 of the blank to be cut when substantially flat-topped file teeth are desired, but with the radial plane 63 spaced from the cutter axis 33 a distance slightly greater than the cutting radius.

Vertical adjustment of the cutting head assembly 48 with respect to the point T at the face of the blank to be cut so that engagement of the cutters with the stock takes place either to one side or the other of the point T effects milling of transversely convex or concave filing surfaces on the blanks, the degree of convexity or concavity depending upon the extent of raising or lowering of the head 48 with respect to the point T.

File teeth having pronounced transversely convex cutting edges are formed on the file blanks with the axis 33 of the cutting head assembly 48 disposed closer to the radial plane 63 of the blank to be cut as shown in Figure 14, where it is seen that the radial plane 63 passes between the point of engagement of the cutters with the blank and the axis 33 of the head 40.

This results from the fact that in this position of the cutting head 48, the curvature of the stock causes the slanting heel 37 of the cutter to uniformly withdraw from the stock during travel of the cutter toward the center of the stock and to dig uniformly deeper during cutter travel from the center of the stock toward completion of the cut. Thus the curved edge 38 formed by the heel 37 of the cutter is appreciably flattened and of substantially less curvature than the edge 36 of the groove cut in the stock by the face 35 of the cutter.

Consequently, upon indexing of the stock the distance required to form a complete file tooth, the cutting edge of which extends entirely across the width of the stock, the ends of the tooth will be cut down in the manner illustrated in Figure 5.

File teeth having pronounced transversely concave cutting edges are formed on the file blanks with the axis 33 of the cutting head assembly 48 disposed remote from the radial plane 63 of the blank to be cut as shown diagrammatically in Figure 15.

This follows from the fact that in this position of the cutting head 48, the curvature of the stock causes the slanting heel 37 of the cutter to dig uniformly deeper into the stock during travel of the cutter toward the center of the stock and uniformly shallower during travel of the cutter from the center of the stock toward completion of the cut. Thus upon indexing of the stock the distance required to form a complete file tooth, the cutting edge of which extends entirely across the width of the stock, the central portion of the tooth will be cut down in the manner illustrated in Figure 8.

In all positions of the cutting head 48 shown in Figures 12, 14 and 15, the axis 33 of the cutter lies parallel to but spaced to one side from the radial plane 63 of the blank to be cut. These dispositions of the cutting head in addition to enabling any desired shape of teeth to be milled in the blanks, also provide adequate clearance for the cutters during their travel to and from cutting engagement with the curved stock.

In actual practice, indexing motion of the stock may be a trifle less than the maximum distance between the two curved edges 36 and 38 so that the points of the teeth milled in the blank lie below the face of the blank, and the faces 35 of the cutting bits are slanted to form file teeth the fronts of which are undercut. If desired, the indexing motion may be sufficiently less than the maximum space between the curved edges 36 and 38 so that the resulting points of the milled teeth lie below any surface irregularities on the face of the stock, and in this instance, the surfacing cutters may be dispensed with.

The surfacing head, however, is highly useful by reason of the fact that it may be employed not only to correct irregularities in stock thickness but to remove the usually decarbonized low quality layer of surface stock. The surfacing head thus enables the milling of a very uniform and lasting cutting surface on the file blanks, and prevents "crowding" of the teeth forming cutting bits such as occurs when the stock is oversize. When oversize stock is presented to the tooth forming cutters the crowding of the same which results damages the internal structure of the file stock and renders it highly susceptible to warping during the hardening process following milling.

In the milling of transversely flat file teeth the surfacing head should be positioned to act on the stock at areas thereof at which the cutting edges of the file teeth are to be formed. For convenience, the surfacing head may be so positioned with respect to the center of arcuate motion of the blanks that the area of the blank acted upon by the surfacing tools 53 is exactly diametrically opposite the area of the blank swept by the tooth forming cutters 31, with the surfacing head axis substantially parallel to the radial plane 63 of the blanks and spaced above the same a distance equal to the spacing between the axis 33 of the tooth forming cutter head from the plane 63. Thus the points of the milled teeth are always formed at a surfaced portion of the blanks.

After a blank has been cut by any of the described methods, it is removed from the carrier wheel preferably at point 65 which may be regarded as an unloading station, without interrupting the motion of the wheel. A new blank curved to fit the wheel may be then substituted in its place, and this operation is usually carried out as at 66, which location may be regarded as a loading station for curved file stock or blanks.

After the longitudinally convex face of the blank has been milled, it may be hardened directly if the longitudinal curvature is desired, or it may be straightened first and thereafter hardened.

If desired, both surfaces of the stock may be cut in accordance with the method of this invention. If a double face file is required, it is only necessary to bend the stock having one face thereof cut as described to the opposite curvature so that its uncut surface may be presented to the cutters.

Obviously, such double face files may either be hardened in their curved shape, or straightened first and thereafter hardened.

With the apparatus described, it will be seen that the method for milling file teeth essentially consists in bending the blanks to a predetermined curvature, and advancing the same in the arc of their curvature first past the surfacing cutters and then past the tooth forming cutters.

If desired, a rough cutting operation may be performed on the blanks at the time of surfacing of the same. To this end, a combined surfacing and rough cutting head 47' may be employed as diagrammatically illustrated in Figures 19, 20, 21, and 22. In this instance, the surfacing head is shown provided with three rough cutters R1, R2, and R3, in addition to five surfacers S1, S2, S3, S4, and S5. These cutters may be arranged spirally, as shown, or concentric in the event of intermittent rotation of the carrier wheel. In practice, however, there are usually 12 to 15 surfacing cutters and 9 or 10 rough cutters on the head 47'.

As will be apparent from Figures 19 and 20, the surfacing cutters gradually trim down the surface of the stock with the final bit S5 cutting deep enough to effect removal of the decarbonized stock regardless of its variation in thickness. These surfacing tools engage the stock ahead of the rough cutters R1, R2, and R3 and extend over the areas of the stock at which the points of the file teeth are to be formed as indicated in Figure 20, where the file teeth to be cut are shown in construction lines.

It is the function of the rough cutters R1, R2, and R3 to rough out the major portion of the grooves 26 which form the file teeth, and these rough cutters are designed to progressively gouge out equi-spaced grooves 65 similar in shape to the grooves 26 milled by the final cutting bits 31 but shallower and of less width than the grooves 26. This leaves less work for the final cutting bits 31 which are consequently able to produce better file teeth.

The concept of effecting surfacing and rough cutting on a curved file blank previously to the final or finish milling operation thereon entirely precludes "crowding" of any of the cutting bits. Thus, inasmuch as the internal structure of the file stock is undamaged, warping in the hardening process is held to a substantially insignificant minimum.

Attention is directed to the fact that the cutting bits 31 and the surfacing cutters 53 are arranged in a single row on the cutting heads 40 and 47, respectively. This arrangement greatly simplifies the grinding or sharpening of the bits as they do not have to be removed from the head for this operation as was the case with the cutting head arrangement of the aforementioned Anheuser patent.

From the foregoing description, taken in connection with the accompanying drawings, it will be readily apparent to those skilled in the art that the method of this invention permits the milling of files with any desired shape of cutting surface, and that the apparatus for carrying out this method is desirably simple.

What I claim as my invention is:

1. The hereindescribed method of milling file teeth in a blank which comprises: longitudinally flatwise bending the blank to a predetermined arc; and milling closely spaced arcuate grooves transversely across the longitudinally convex face of the blank with a suitable tool revolved about an axis parallel to a radial plane of the arcuate blank and which plane lies close to the area of the blank swept by the tool in the cutting operation.

2. The hereindescribed method of making a milled file from a blank which comprises: longitudinally flatwise bending the blank to a predetermined arc; milling closely spaced arcuate grooves transversely across the longitudinally convex face of the blank with a suitable tool revolved about an axis parallel to a radial plane of the arcuate blank and which plane lies close to the area of the blank swept by the tool in the cutting operation; and hardening said file blank after the milling operation.

3. The hereindescribed method of making a milled file from a blank which comprises: longitudinally flatwise bending the blank to a predetermined arc; milling closely spaced arcuate grooves transversely across the longitudinally convex face of the blank with a suitable tool revolved about an axis parallel to a radial plane of the arcuate blank and which plane lies close to the area of the blank swept by the tool in the cutting operation; straightening the milled file blank; and thereafter hardening the same.

4. The hereindescribed method of making a milled file from a blank which comprises: longitudinally flatwise bending the blank to a predetermined arc; milling closely spaced arcuate grooves transversely across the longitudinally convex face of the blank with a suitable tool revolved about an axis parallel to a radial plane of the arcuate blank and which plane lies close to the area of the blank swept by the tool in the cutting operation; bending the blank to a reverse curvature so that the uncut face of the blank is of convex shape in a direction lengthwise of the blank; and repeating the milling operation so that teeth are formed on both faces of the blank.

5. The hereindescribed method of making a milled file from a blank which comprises: longitudinally flatwise bending the blank to a predetermined arc; milling closely spaced arcuate grooves transversely across the longitudinally convex face of the blank with a suitable tool revolved about an axis parallel to a radial plane of the arcuate blank and which plane lies close to the area of the blank swept by the tool in the cutting operation; bending the blank to a reverse curvature so that the uncut face of the blank is of convex shape in a direction lengthwise of the blank; repeating the milling operation so that teeth are formed on both faces of the blank; straightening the milled blank; and hardening the same.

6. The hereindescribed method of presenting a file blank to a cutter revolving about a fixed axis for milling teeth in the blank which comprises: longitudinally flatwise bending the blank to a predetermined arc; and engaging the longitudinally convex face of the blank with the cutter by endwise motion of the blank in the arc of its curvature about an axis crosswise of the cutter axis and so located with respect thereto that said cutter axis when extended passes to one side of the axis of arcuate motion of the blank a distance substantially equal to the radial distance of the cutter from its axis.

7. The hereindescribed method of presenting a file blank to a cutter the point of which revolves in a circular path about a fixed axis for milling file teeth transversely in the blank which comprises; longitudinally flatwise bending the blank to a predetermined arc; and engaging the longitudinally convex face of the blank with the cutter point by endwise motion of the blank in the arc of its curvature about an axis so located with respect to the cutter axis that one portion of the circular path in which the cutter point travels passes between the longitudinally curved faces of the blank while the diametrically opposite portion of said circular path is spaced a distance to one side of said curved faces of the blank to thereby provide clearance for the cutter point during its travel to and from engagement with the blank.

8. The hereindescribed method of presenting a file blank to a cutter revolving about a fixed axis for milling file teeth transversely in the blank which comprises: longitudinally flatwise bending the blank to a predetermined arc; and engaging the longitudinally convex face of the blank with the cutter by continuous endwise motion of the blank in the arc of its curvature about an axis crosswise of the cutter axis and so located with respect thereto that a radial plane of the blank parallel to the cutter axis passes close to the area of the blank engaged by the cutter.

9. The hereindescribed method of presenting a file blank to a cutter revolving about a fixed axis for milling file teeth transversely in the blank which comprises: longitudinally flatwise bending the blank to a predetermined arc; and engaging the longitudinally convex face of the blank with the cutter by intermittent endwise motion of the blank in the arc of its curvature about an axis crosswise of the cutter axis and so located with respect thereto that a radial plane of the blank parallel to the cutter axis passes close to the area of the blank engaged by the cutter.

10. The hereindescribed method of presenting a file blank to a cutter revolving about a fixed axis for milling transversely convex cutting teeth on the blank which comprises: longitudinally flatwise bending the blank to a predetermined arc; and engaging the longitudinally convex face of the blank with the cutter by endwise motion of the blank in the arc of its curvature about an axis crosswise of the cutter axis and so located with respect thereto that a radial plane of the blank parallel to but spaced from the cutter axis lies between the cutter axis and the area of the blank swept by the cutter.

11. The hereindescribed method of presenting a file blank to a cutter having a point revolving in a circular path about a fixed axis for milling transversely concave cutting teeth on the blank which comprises: longitudinally flatwise bending the blank to a predetermined arc; and engaging the longitudinally convex face of the blank with the cutter by endwise motion of the blank in the arc of its curvature about an axis crosswise of the cutter axis and so located with respect thereto that a radial plane of the blank parallel to the cutter axis lies a substantial distance outside the circular path in which the cutter point travels.

12. The hereindescribed method of milling file teeth in a blank which comprises: longitudinally flatwise bending the blank to a predetermined arc; advancing the blank endwise in the arc of its curvature; treating the longitudinally convex face of the advancing blank in which teeth are to be milled with a surfacing tool to render the surface of the blank substantially transversely flat; and milling closely spaced arcuate grooves transversely across said longitudinally convex face of the blank with a suitable tooth forming tool revolving about a fixed axis spaced from but parallel to a radial plane of the blank and with the tool sweeping transversely across the longitudinally curved face of the blank at an area thereof close to said radial plane of the blank.

13. An apparatus for milling teeth in file blanks comprising: a wheel mounted for rotation on a fixed axis and adapted to have file blanks bent longitudinally to the curvature of the periphery of the wheel secured thereto; and a cutter facing the periphery of the wheel for milling tooth forming grooves in the blanks, said cutter being mounted to revolve about an axis crosswise of the wheel axis and parallel to but spaced from a radial plane of the wheel.

14. An apparatus for milling teeth in a file blank longitudinally flatwise bent to a predetermined arc comprising: means for carrying and arcuately moving the file blank endwise in the arc of its curvature about a fixed axis; and a cutter facing the outer longitudinally convex face of the blank and mounted to revolve about an axis crosswise of the axis of arcuate motion of the blank and parallel to but spaced from a radial plane of the blank.

15. An apparatus for milling teeth in a file blank longitudinally flatwise bent to a predetermined arc comprising: a rotatable carrier for the file blank operable to move the file blank endwise in the arc of its curvature about a fixed axis; a cutter facing the outer longitudinally convex face of the blank and mounted to revolve about an axis crosswise of the axis of arcuate motion of the blank and parallel to but spaced from a radial plane of the blank; means for revolving the cutter so that one revolution thereof effects milling of an arcuate groove transversely across said convex face of the blank; and means for rotating the carrier so as to effect advance of the file blank an arcuate distance equal to the pitch of the teeth to be milled therein during each revolution of the cutter.

16. An apparatus for milling teeth in file blanks comprising: a wheel mounted for rotation on a fixed axis and adapted to have file blanks bent longitudinally to the curvature of the periphery of the wheel secured thereto; a surfacing tool positioned adjacent to the periphery of the wheel for removing surface irregularities on the face of the blanks in which teeth are to be milled; and a tooth forming cutter facing the periphery of the wheel for milling grooves in the blanks, said cutter being mounted to revolve about an axis crosswise of the wheel axis and parallel to but spaced from a radial plane of the wheel; and means for rotating the wheel to progressively present the blanks thereon to the surfacing and tooth forming tools with rotation in a direction such that the blanks on the wheel are first presented to the surfacing tools.

17. That step in the milling of file teeth in longitudinally curved file stock which comprises so positioning a revolving cutter relative to the curved face of the stock in which teeth are to be milled that milling is effected at an area of said face of the stock tangent to a plane parallel to a line (line 39 of the specification) substantially passing through a point on the heel of the final cutter bit spaced from its root forming extremity a distance substantially equal to the depth of the groove to be milled in the stock, and through a point on the plane normal to the cutter axis which represents the bottom of the groove to be milled by the root forming extremity of the final cutter bit and close to the cutter axis.

18. The hereindescribed method of milling file teeth in a blank which comprises: longitudinally flatwise bending the blank to a predetermined arc; and milling closely spaced arcuate grooves transversely across the longitudinally convex face of the blank with a suitable tool having a number of cutting bits arranged to progressively engage the stock and with the tool rotatable about an axis extending crosswise of the axis of the blank and so related to the face of the stock in which the file teeth are to be milled that cutting is effected at an area of the face of the stock tangent to a plane parallel to a line (line 39 of the specification) substantially passing through a point on the heel of the final cutter bit spaced from its root forming extremity a distance substantially equal to the depth of the groove to be milled in the stock, and through a point on the plane normal to the cutter axis which represents the bottom of the groove to be milled by the root forming extremity of the final cutter bit and close to the cutter axis.

19. An apparatus for milling teeth in a file blank longitudinally flatwise bent to a predetermined arcuate shape comprising: means for carrying and arcuately moving the file blank endwise in the arc of its curvature; and a cutting head facing the outer longitudinally convex face of the blank and mounted to revolve about an axis crosswise of the axis of arcuate motion of the blank and parallel to but spaced from a radial plane of the blank, said cutting head having a single row of cutting bits thereon arranged to mill a single groove in the blank during one complete revolution of the cutting head.

20. An apparatus for milling teeth in file blanks comprising, in combination: a wheel mounted for rotation on a fixed axis and adapted to have file blanks bent longitudinally to the curvature of the periphery of the wheel secured thereto; two rotatable cutting heads each facing the periphery of the wheel and engageable with blanks on the wheel to effect milling of file teeth therein, one of said cutting heads having surfacing and roughing bits thereon and the other of said cutting heads having a single row of finish cutting bits thereon; and means for rotating the wheel to progressively present the blanks thereon to the cutting heads with rotation in a direction such that the blanks on the wheel are presented to the first mentioned cutting head for surfacing and rough cutting prior to their presentation to the finish cutting bits on said other cutting head.

21. In the hereindescribed method of cutting file teeth in a blank: the steps of flatwise bending the blank; and presenting the same to a cutting tool rotating on a fixed axis with the cutters of the tool sweeping transversely arcuately across the bent face of the blank in a manner such that the edges of the groove at said face of the blank have substantially identical curvature.

22. The hereindescribed method of milling file teeth in a file blank which comprises: longitudinally flatwise bending the blank to a predetermined arc; advancing the blank endwise in the arc of its curvature; subjecting one longitudinally curved face of the blank in which teeth are to be milled to a preliminary grooving operation by a suitable cutting tool located at one point in the path of the advancing blank so as to produce equispaced unfinished tooth forming grooves in said face of the blank; and finishing the grooves thus cut in a final tooth forming operation by another cutting tool located at another point in the path of travel of the advancing blank remote from the point at which the preliminary grooving operation takes place.

ALFRED ANHEUSER.